United States Patent [19]

Gallup

[11] Patent Number: 5,622,632

[45] Date of Patent: *Apr. 22, 1997

[54] PROCESS FOR CONTROLLING NITROGEN DIOXIDE AND/OR AMMONIA EMISSIONS FROM GEOTHERMAL POWER PLANTS

[75] Inventor: Darrell L. Gallup, Chino Hills, Calif.

[73] Assignee: Union Oil Company of California, El Segundo, Calif.

[*] Notice: The term of this patent shall not extend beyond the expiration date of Pat. No. 5,364,439.

[21] Appl. No.: 306,020

[22] Filed: Sep. 14, 1994

Related U.S. Application Data

[63] Continuation-in-part of Ser. No. 875,344, Apr. 29, 1992, Pat. No. 5,364,439.

[51] Int. Cl.$^6$ ................................................. C02F 1/42
[52] U.S. Cl. ........................................ 210/669; 210/685
[58] Field of Search ........................... 210/679, 687, 210/683, 684, 685, 686, 677, 676, 669; 423/239

[56] References Cited

U.S. PATENT DOCUMENTS

| | | | |
|---|---|---|---|
| 3,250,705 | 5/1966 | Levendusky | 210/688 |
| 3,385,787 | 5/1968 | Crits et al. | 210/686 |
| 3,414,508 | 12/1968 | Applebaum et al. | 210/686 |
| 3,475,330 | 10/1969 | Gilles | 210/685 |
| 3,723,308 | 3/1973 | Breck | 210/681 |
| 3,849,306 | 11/1974 | Anderson | 210/685 |
| 3,984,313 | 10/1976 | Higgins | 210/26 |
| 4,046,888 | 9/1977 | Maeshima et al. | 423/239 |
| 4,098,690 | 7/1978 | Semmens | 210/DIG. 28 |
| 4,370,234 | 1/1983 | Marsland | 210/617 |
| 4,448,711 | 5/1984 | Motojima et al. | 210/684 |
| 4,481,112 | 11/1984 | Hitzel | 210/620 |
| 4,522,727 | 6/1985 | Weber | 210/673 |
| 4,549,396 | 10/1985 | Garwood et al. | 518/703 |
| 4,737,316 | 4/1988 | Macedo et al. | 252/633 |
| 4,831,207 | 5/1989 | O'Keefe et al. | 585/737 |
| 4,867,954 | 9/1989 | Stanialis et al. | 423/239 |
| 4,961,917 | 10/1990 | Byrne | 423/239 |
| 5,028,340 | 7/1991 | Gallup | 210/753 |
| 5,032,284 | 7/1991 | Gallup et al. | 210/697 |
| 5,061,373 | 10/1991 | Gallup | 210/697 |
| 5,085,782 | 2/1992 | Gallup et al. | 210/750 |
| 5,167,834 | 12/1992 | Gallup et al. | 210/747 |
| 5,182,027 | 1/1993 | Gallup et al. | 210/696 |
| 5,304,365 | 4/1994 | Taborsky | 423/352 |
| 5,364,439 | 11/1994 | Gallup et al. | 423/210 |
| 5,405,503 | 4/1995 | Simpson et al. | 203/10 |
| 5,407,582 | 4/1995 | Poschmann et al. | 210/669 |

FOREIGN PATENT DOCUMENTS

WO9322032  11/1993  WIPO.

OTHER PUBLICATIONS

Russell L. Culp and Gordon L. Culp, *Advanced Wastewater Treatment*, Van Nostrand Reinhold Company, pp. 210–215, 1971.

Donald W. Breck, *Zeolite Molecular Sieves*, Robert E. Krieger Publishing Company, pp. 589–590, 1984, (original edition, 1974).

*Primary Examiner*—Cynthia L. Nessler
*Attorney, Agent, or Firm*—Yale S. Finkle; Gregory F. Wirzbicki

[57] ABSTRACT

The emissions of nitrogen dioxide and ammonia from cooling towers in geothermal power plants are controlled by contacting the steam condensate used as make-up water for the cooling tower with a zeolite or other molecular sieve to remove ammonia and/or ammonium ions from the condensate before it is passed into the cooling tower.

26 Claims, 3 Drawing Sheets

PROCESS FOR CONTROLLING NITROGEN DIOXIDE AND/OR AMMONIA EMISSIONS FROM GEOTHERMAL POWER PLANTS

CROSS-REFERENCES TO RELATED APPLICATIONS

This application is a continuation-in-part of U.S. application Ser. No. 875,344 filed in the United States Patent and Trademark Office on Apr. 29, 1992 and now U.S. Pat. No. 5,364,439. The disclosure of this patent is incorporated herein by reference in its entirety.

BACKGROUND OF THE INVENTION

This invention relates generally to processes for controlling the emissions of nitrogen dioxide and/or ammonia from geothermal power plants and is particularly concerned with a method of removing ammonia and ammonium ions from steam condensate produced in the power plant prior to passing the condensate to an open cooling tower.

General processes by which geothermal brine can be used to generate electric power have, of course, been known for some time. Geothermal brine, having a wellhead temperature of over about 400° F. and a wellhead pressure of over about 400 psig, for example, can be flashed to a reduced pressure to convert some of the water in the brine into steam. Steam produced in this manner is generally used in conventional steam turbine-type power generators to produce electricity. After the steam passes through the turbine, it is normally condensed, and a portion of the condensate is passed to a cooling tower where it serves as make-up water. The "used" geothermal brine generated in the process is most commonly reinjected into the ground to replenish the aquifer from which it was extracted and to prevent ground subsidence. Reinjection of geothermal brine also helps to avoid the problems associated with the disposal of the large amounts of this saline and usually highly-contaminated liquid.

One of the many problems which has added to the overall cost of producing electric power by the use of geothermal brines relates to the undesirable emission of nitrogen dioxide ($NO_2$) from cooling towers used in the power generating portion of the power plant. The nitrogen dioxide results from the oxidation of ammonia in the steam condensate to nitrites ($NO_2^-$) by naturally occurring nitrifying bacteria, the subsequent reduction of the nitrites to nitric oxide (NO) by iron ($Fe^{+2}$) with the concomitant production of hydrogen ions, and the oxidation of the nitric oxide to nitrogen dioxide upon contact with air in the cooling tower. Moreover, the formation of these hydrogen ions depresses the pH of the cooling tower waters which results in corrosion of the power plant's cooling system and piping used to dispose of unwanted condensate.

It has been taught in U.S. Pat. No. 5,032,284 that emissions of nitrogen dioxide from the cooling towers in geothermal power plants can be substantially avoided by contacting the steam condensate, usually in the cooling tower, with an amount of an oxidizing biocide which is effective to convert substantial amounts of the nitrites formed by oxidation of the ammonia into less reactive nitrate salts. A second nonoxidizing biocide (usually a carbamate) is added to the condensate in amounts and at periodic intervals which have been determined to effectively control the growth of organisms including nitrifying bacteria in the condensate handling system to below problem levels. Unfortunately, the cost of the oxidizing biocide and the carbamate biocide can be as much as $100,000 per year, and therefore this method of control is quite expensive.

As can be seen, there is still a need for new processes to control nitrogen dioxide emissions in the steam condensate handling portions of geothermal brine power plants in an economical manner.

SUMMARY OF THE INVENTION

In accordance with the invention, it has now been found that the emissions of ammonia and/or nitrogen dioxide from a system for handling the flow of steam condensate or other aqueous streams containing ammonia, ammonium ions derived from ammonia precursors in said condensate or other aqueous stream, or mixtures thereof can be substantially avoided and/or significantly decreased by contacting at least a portion of the condensate or other aqueous stream with a molecular sieve to remove at least a portion of the ammonia and/or ammonium ions present. Although any molecular sieve can normally be used in the process of the invention, it is preferred that crystalline aluminosilicate zeolites, especially naturally occurring zeolites, such as chabazite and clinoptilolite, be used because they are relatively inexpensive, and their use results in an efficient, cost effective process for avoiding ammonia and nitrogen dioxide emissions.

The process of the invention, when used in a geothermal power plant, can be made even more economical by utilizing geothermal brine to regenerate the zeolite or other molecular sieve after it has become nearly saturated with ammonia and/or ammonium ions. By contacting the spent zeolite or other molecular sieve with such a brine, ammonium ions and ammonia molecules are displaced from the sieve by alkali metal cations, such as sodium, and alkaline earth metal cations, such as calcium, in the brine, thereby regenerating the zeolite or other sieve for re-use in the process. Since geothermal brines normally contain relatively large amounts of silica, it is preferred to treat the brine either to remove the silica or to stabilize the silica against precipitation before the brine is used as a regenerant. Such treatment prevents silica from fouling the zeolite or other molecular sieve.

By removing the ammonia and/or ammonium ions from the steam condensate prior to its introduction into the cooling tower of a geothermal power plant, the process of the invention avoids the necessity of using expensive oxidative and other biocides in the cooling tower to control nitrogen dioxide emissions. Since ammonia and ammonium ions have been removed from the condensate, the nitrifying bacteria in the cooling tower have no nutrients to feed on, and therefore the formation of nitrites and their subsequent conversion into nitrogen dioxide emissions and hydrogen ions, which render the cooling tower waters corrosive, is substantially avoided. Furthermore, the use of geothermal brine to regenerate the zeolite or other molecular sieve used to remove the ammonia and ammonium ions from the condensate makes the process of the invention even more economical.

DETAILED DESCRIPTION OF THE INVENTION

Figure 1:
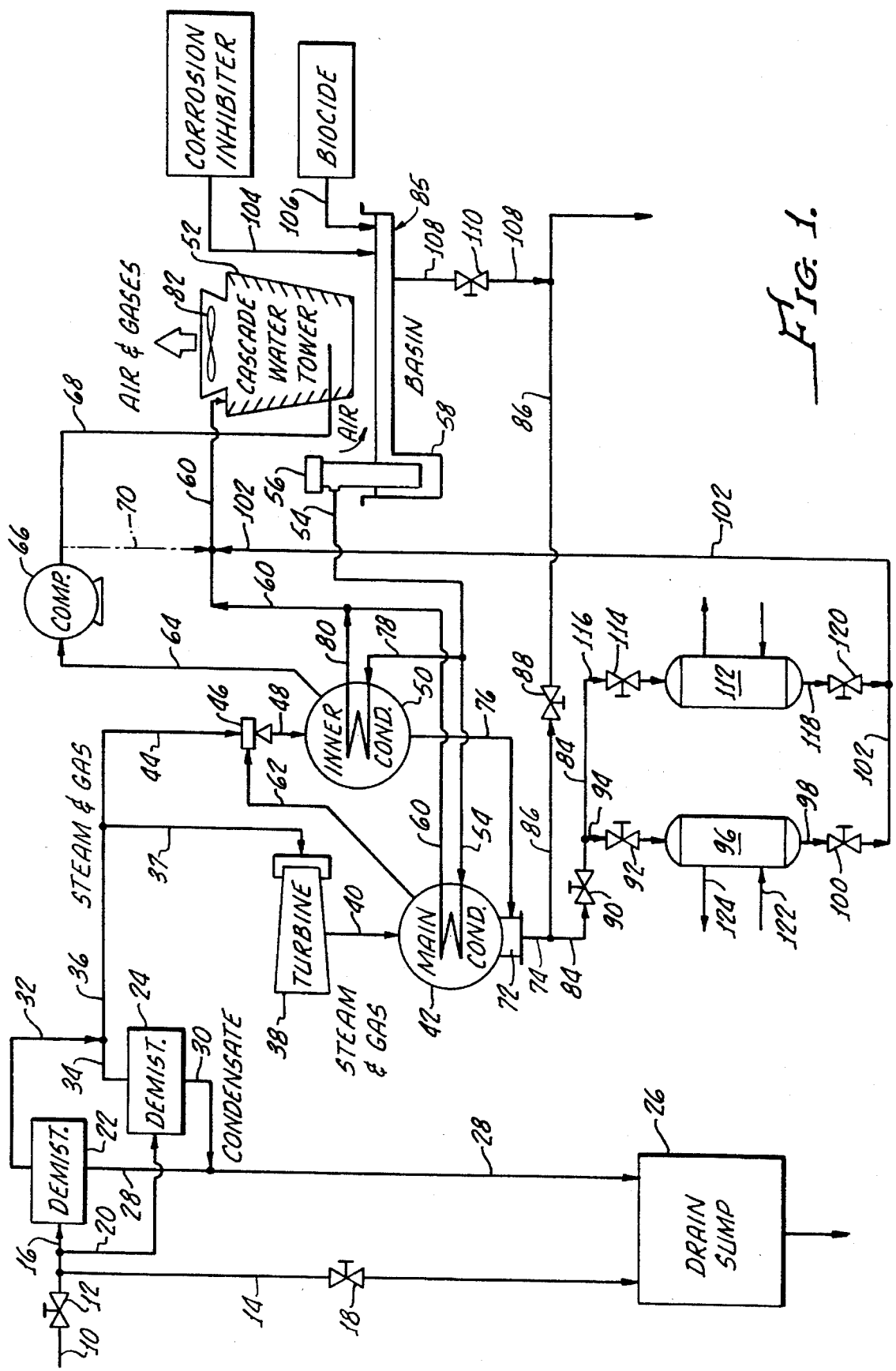
FIG. 1 in the drawing is a schematic flow diagram of the power generating portion of a geothermal power plant showing the layout of equipment used for generating electrical power from geothermal steam and illustrating the use of the process of the invention to control emissions of ammonia and nitrogen dioxide from the cooling tower of the power plant.

FIG. 1 in the drawing shows the power generating portion of a geothermal power plant in which geothermal brine is processed to produce steam which is then used to generate electricity. The process depicted in the figure is a preferred embodiment of the process of the invention in which the emissions of ammonia and/or nitrogen dioxide from a cooling tower are substantially prevented or reduced by treating at least a portion of the steam condensate generated in the process with a molecular sieve in order to remove ammonia and ammonium ions from the portion of the condensate used as make-up water for the cooling tower. It will be understood that the process of the invention is not limited to use in geothermal power plants but can be used in any process in which it is desired to remove ammonia and/or ammonium ions from aqueous streams, especially aqueous streams fed to cooling towers. It should be noted that FIG. 1 is a simplified process flow diagram and therefore does not show many types of equipment, such as heat exchangers, valves, separators, heaters, compressors, etc., not essential for understanding the invention by one skilled in the relevant art.

In the process depicted in FIG. 1 of the drawing, a mixture of steam and noncondensable gases (usually ammonia, hydrogen sulfide and carbon dioxide) is passed from the brine handling portion of the geothermal power plant, which brine handling portion is not shown in the figure, through line 10 and valve 12 into the power generating portion of the power plant. A portion of the steam and noncondensable gases is passed through line 16 into demister 22, and another portion is passed through line 20 into demister 24. The demisters serve to remove any droplets of brine that are carried over with the steam from the brine handling portion of the power plant.

The brine handling portion of the power plant is described in detail in U.S. Pat. No. 5,032,284, the disclosure of which is incorporated herein by reference in its entirety, and consists of a wellhead separation step, a flash crystallization step, a brine clarification step, a filtration and settling step, and a steam conditioning step. In the wellhead separation step, a high temperature and high pressure mixture of steam, noncondensable gases, such as hydrogen sulfide, carbon dioxide and ammonia, and brine is removed from geothermal brine extraction wells and separated into liquid brine and gases including steam. The brine is then passed to the flash crystallization step where dissolved silica is removed from the brine by crystallization or seeding. Steam produced in this step is then combined with the steam and noncondensable gases removed at the wellhead and passed to the steam conditioning step. The flashed brine from the crystallization step is sent to the brine clarification step where silica and other silicious material is separated from the brine by gravity, and the clarified brine is sent to the filtering and settling step prior to being disposed of in a brine injection well. The steam and noncondensable gases from the wellhead separation step and the flash crystallization step are cleaned and conditioned in the steam conditioning step prior to being passed through line 10 and valve 12 into the power generating portion of the process.

Referring again to FIG. 1 in the drawing, valves 12 and 18 are used to control the flow of steam and noncondensable gases into the power generating portion of the power plant. In the event of steam or power generating problems, steam can be discharged through line 14 and valve 18 into drain sump 26. If such problems do occur, it may be necessary to divert a portion of the steam exiting demisters 22 and 24 through lines 28 and 30, respectively, and valves, not shown in the figure, to drain sump 26.

Under normal operations, the steam and noncondensable gases are passed from the demisters 22 and 24 through lines 32 and 34, respectively, into common conduit 36 and then through line 37 into steam turbine generator 38 to produce electricity. The steam and noncondensable gases exit the turbine generator through line 40 and are passed into a main condenser 42. A small slipstream of steam and noncondensable gases is diverted from conduit 36 through line 44 to steam educter 46, which is powered by noncondensable gases removed from the main condenser through line 62, and then through line 48 into second or inner condenser 50.

In the main condenser 42, the steam and noncondensable gases exiting turbine 38 are placed in indirect heat exchange with cooled condensate from open, cascade-type, condensate cooling tower 52, which cooled condensate is passed by means of pump 56 from the sump region 58 of the cooling tower through line 54 into the main condenser. Sufficient heat is transferred from the steam and noncondensable gases in the main condenser to the cooled condensate such that the steam is condensed and the temperature of the cooled condensate is substantially increased, usually by between 30° F. and 50° F. The heated condensate is removed from the main condenser through line 60 and returned to water tower 52 for cooling before being reused.

Noncondensable gases are discharged from the main condenser through conduit 62 into educter 46 where they are mixed with the steam and noncondensable gases in line 44 and then passed through conduit 48 into inner condenser 50. From here, the noncondensable gases are passed through conduit 64 into compressor 66. Compressed gases are discharged from the compressor through discharge conduit 68 containing a sparger (not shown in the figure) at the base of cooling tower 52. Alternatively, the gases may be fed via conduit 70 directly into water return line 60 in which the water pumped from cooling tower 52 through line 54 and main condenser 42 is returned to the cooling tower.

The steam condensate produced in main condenser 42 is passed from the condenser through outlet region 72 into conduit 74. Additional steam condensate produced in inner condenser 50 by indirect heat exchange between the steam and noncondensable gases introduced into the condenser through line 48 and the water from cooling tower 52 introduced into the inner condenser via lines 54 and 78 is removed from the condenser through line 76 and mixed with the steam condensate from main condenser 42 in outlet region 72. The water passed into the inner condenser through line 78 is increased in temperature by indirect heat exchange with the steam and noncondensable gases, and the resultant heated water is removed from the inner condenser through line 80 and passed into line 60 for return to cooling tower 52.

The steam condensate from main condenser 42 and inner condenser 50, which is combined in outlet region 72 of the main condenser, normally contains dissolved ammonia, carbon dioxide and hydrogen sulfide and may also contain metals such as boron, silver, cadmium, cobalt, copper, iron, nickel, lead, antimony, arsenic, mercury, strontium and the like. The presence of these dissolved gases and metals is due to the power plant feed being geothermal fluids from a reservoir in which the fluid was subjected to temperature and pressure conditions sufficient to leach these materials from the surrounding strata. The bulk of the ammonia in the steam and brine fed from such reservoirs into the brine handling portion of the power plant eventually passes into the steam condensate phase in condensers 42 and 50, presumably because of an excess of carbon dioxide in the steam which increases the solubility of ammonia in the condensate by reacting as a base with carbon dioxide to form ammonium carbonate and/or ammonium bicarbonate according to the following reactions:

$$CO_2 + 2NH_3 + H_2O \rightarrow (NH_4)_2CO_3$$

$$CO_2 + NH_3 + H_2O \rightarrow (NH_4)HCO_3$$

However, it is possible that other ammonia precursors (that is, compounds from which ammonia may outgas or be released during condensate treatment operations) besides ammonium carbonate and bicarbonate may be formed in the condensate.

It is normally desired that at least a portion of the condensate in line 74 be passed as make-up water to cooling tower 52. However, when this make-up water and other condensate cascades downwardly through the cooling tower, ammonia is released, either directly, or indirectly by breakdown of ammonia precursors. For example, if the precursor is ammonium carbonate, carbon dioxide and ammonia are released. These gases are then mixed with air and blown into the atmosphere by cooling tower fan 82.

Many types of air-borne organisms have been found to grow at a very rapid rate in the hot, wet environment of cooling tower 52 and condensate catch basin 85. As an example, among the bacteria usually found in cooling tower 52 and catch basin 85 are nitrifying bacteria such as Nitrosomonas and Nitrosococcus, which bacteria consume ammonia and ammonium ions in the cooling tower and produce nitrites. These nitrites are in turn converted into nitrogen dioxide, which is emitted from the cooling tower, in the presence of air and iron, which iron builds up in the cooling tower waters or finds its way into the tower via iron-containing brine that may accidentally carry over into the main condenser from the brine handling portion of the power plant. Furthermore, hydrogen ions formed when the nitrites are converted to nitrogen dioxide tend to decrease the pH of the cooling tower waters which adds to system corrosion problems.

In order to comply with environmental regulations which limit or may limit the amount of nitrogen dioxide and ammonia emissions into the atmosphere and to prevent excessive acidic conditions in the cooling tower, it has been proposed to introduce biocides into the cooling tower in order to help control the nitrifying bacteria therein and to convert nitrites into nitrates. Unfortunately, the biocides which had been proposed for such use are relatively expensive and significantly increase the cost of operating the geothermal power plant. Alternative methods of preventing such emissions and controlling the pH in the cooling tower include attempts to remove ammonia from the condensate passed to the cooling tower so that the nitrifying bacteria in the cooling tower waters have no nutrients on which to feed. Methods that have been tried include stripping the condensate with steam or air, or passing the condensate through an ion exchange resin. Unfortunately, both of these techniques have performed unsatisfactorily. Steam stripping resulted in the removal of less than 50 weight percent of the ammonia in the condensate, evidently because the ammonia was heavily complexed in the condensate with carbonates, sulfides and/or hydroxides.

It has now been found that substantial amounts of ammonia and ammonium ions from ammonia precursors can be successfully removed from the steam condensate that is sent to the cooling tower by contacting the condensate with a molecular sieve, such as a zeolite, prior to passing the condensate to the cooling tower. It has also been found that the use of relatively inexpensive naturally occurring zeolites, such as clinoptilolite and/or chabazite, results in an economic process for not only controlling emissions of nitrogen dioxides and ammonia from cooling towers but also controlling the pH of the water in the cooling tower and thereby preventing excessive corrosion of metal surfaces.

Referring again to FIG. 1 of the drawing, the steam condensate removed from the outlet region 72 of main condenser 42 in line 74, which condensate contains a significant amount of dissolved ammonia and ammonium ions in the form of ammonia precursors, such as ammonium carbonate, ammonium bicarbonate, ammonium sulfide and/or ammonium bisulfide, typically between about 50 and 500 mg/liter, calculated as ammonia, is split into two streams. One of these streams is passed into line 84 for subsequent treatment to remove the ammonia and ammonium ions prior to passage of the treated condensate to cooling tower 52. The other stream is passed through line 86 and valve 88 usually to a sump, not shown in the figure, from which it can be disposed of through a dedicated injection well provided for plant waste fluids.

The composition and pH of the condensate removed from the main condenser will vary depending upon the geographic location of the geothermal wells used to supply steam and/or brine to the power plant. Usually, the pH of the steam condensate ranges from as low as about 4.0 to as high as about 10 and normally is between about 5.0 and 9.0. For example, steam condensate produced in power plants located in southern California typically has a pH between about 8.5 and 9.5 while condensate made in power plants located in northern California usually has a pH that ranges from 4.5 to 6.5. A typical analysis of a steam condensate produced in a power plant located in the Salton Sea area of southern California is set forth below in Table 1.

TABLE 1

| Component | Concentration (mg/liter) | Component | Concentration (mg/liter) |
|---|---|---|---|
| Ag | <0.01** | Li | <0.01 |
| Al | <0.05 | Mg | <0.01 |
| As | <0.001 | Mn | <0.005 |
| B | 2.5 | Mo | <0.02 |
| Ba | <0.005 | Na | 0.09 |
| Be | <0.002 | Ni | <0.04 |
| Ca | 0.05 | Pb | <0.05 |
| Cd | 0.01 | Sb | <0.05 |
| Co | <0.02 | Se | <0.002 |
| Cr | <0.01 | Si | <0.03 |
| Cu | 0.075 | Sr | <0.04 |
| Fe | 0.01 | Ti | <0.01 |
| Hg | 0.0005 | V | <0.01 |
| K | 0.03 | Zn | 0.02 |
| Cl | 1 | OH | 50 |

TABLE 1-continued

| Component | Concentration (mg/liter) | Component | Concentration (mg/liter) |
|---|---|---|---|
| CN | <0.01 | S= | 35 |
| CO$_3$= | 360 | TDS* | 80 |
| F | <0.2 | pH | 9.2 |
| NH$_3$ | 270 | | |

*"TDS" [=] Total dissolved solid
**"<" [=] None detected below level shown

As can be seen this condensate contains a substantial amount of carbonate ions derived from dissolved carbon dioxide and ammonium carbonate, ammonia in the form of dissolved ammonia and ammonium ions, and sulfide ions derived from dissolved hydrogen sulfide and ammonium sulfide. Although the concentration of the many cations shown in the table is very low, it is possible that higher concentrations can be found when brine is accidentally carried over into the power generating portion of the power plant. For example, it would not be uncommon for the concentration of arsenic to reach as high as 0.02 mg/liter or that of mercury to rise to about 0.005 mg/liter. The total dissolved solids concentration of about 80 ppmw is due to the formation of ammonium salts, primarily ammonium carbonate.

Due to the high concentration of ammonia in the steam fed to condenser 42 and its ability to significantly partition in the condensate, the solubility of hydrogen sulfide is increased by reaction to form ammonium sulfide and bisulfide. Although carbon dioxide is the major gas component in the steam, its slow rate of partitioning and reaction limits the amount of carbonate and bicarbonate ion in the condensate. Upon exposure to air, dissolved sulfide in the condensate rapidly oxidizes to sulfate. Thus, the condensate whose composition is set forth in Table 1, after contact with air, is primarily a solution of ammonium carbonate, ammonium hydroxide and ammonium sulfate exhibiting a pH of about 9.0, which solution may also contains dissolved ammonia, dissolved hydrogen sulfide and dissolved carbon dioxide.

The steam condensate exiting main condenser 42 in line 74 usually contains between about 100 and 400 mg/liter, frequently between about 200 and 350 mg/liter, calculated as ammonia, of dissolved ammonia and ammonium ions in the form of ammonia precursors. In addition the condensate will contain between about 5 and 500, usually between about 10 and 200, and frequently between 20 and 50 mg/liter of dissolved hydrogen sulfide and sulfide ions, calculated as sulfide ion. Furthermore, the condensate will normally contain between about 100 and 1000, usually between about 150 and 600, and frequently between 200 and 500 mg/liter of dissolved carbon dioxide and carbonate ions, calculated as carbonate ion.

Referring again to FIG. 1 of the drawing, the portion of the steam condensate exiting main condenser 42 in line 74 that is to be sent to the cooling tower, usually between about 75 and about 99 volume percent, is passed through line 84, valve 90, line 94 and valve 92 into adsorption vessel 96 wherein it is passed downwardly in contact with a packed bed of a molecular sieve. During this contacting step, ammonium ions in the condensate exchange with sodium and/or other alkali or alkaline earth metal cations held at ion exchange sites in the molecular sieve while ammonia molecules are adsorbed within the pores or cavities of the sieve. Although the molecular sieve is usually present in vessel 96 in the form of a packed bed, it will be understood that the sieve could be used in the vessel as a fluidized bed through which the condensate from main condenser 42 is passed upward or it could be slurried with the condensate in the vessel.

In general, any crystalline molecular sieve which has a substantial amount of surface area and at least some ion exchange capacity can be used in adsorption vessel 96. The term "molecular sieve" as used herein refers to a solid crystalline material having in its anhydrous form micropores as a consequence of having an open framework lattice characterized by an orderly arrangement of corner-sharing oxide tetrahedra, including, but not limited to AlO$_2$, SiO$_2$, FeO$_2$, TiO$_2$, BO$_2$ and PO$_2$ tetrahedra. Molecular sieves include zeolites, crystalline silicas, crystalline aluminas and the like. It is preferred that the molecular sieve utilized not only have adsorptive properties but also a significant amount of ion exchange capacity. Although nonzeolitic molecular sieves which adsorb ammonia can be used in the process of the invention, it is preferred that a zeolitic molecular sieve be utilized. The term "nonzeolitic" as used herein refers to molecular sieves whose frameworks are not formed of substantially only silicon and aluminum atoms in tetrahedral coordination with oxygen atoms, whereas the term "zeolitic" as used herein refers to molecular sieves whose frameworks are formed of substantially only silicon and aluminum atoms in tetrahedral coordination with oxygen atoms such as the framework present in Y zeolites.

Examples of nonzeolitic molecular sieves which may be used in adsorption vessel 96 include crystalline silicas such as silicalite, silicoaluminophosphates, aluminophosphates and ferrosilicates. The zeolitic molecular sieves which can be used include synthetic zeolites, such as Y zeolites, ZSM-5 zeolites, zeolite Beta, and zeolite Omega, and naturally occurring zeolites, such as faujasite, chabazite, phillipsite, gmelinite, mordenite, clinoptilolite, erionite, natrolite and heulandite. Typically, it is preferred that the pore size of the molecular sieve be smaller rather than larger, with pore sizes below 6.0 angstroms normally preferred. The term "pore size" as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by Robert E. Krieger Publishing Company in 1984, the disclosure of which book is herein incorporated by reference in its entirety.

The naturally occurring zeolites are the most preferred molecular sieves for use in the process of the invention because they are relatively inexpensive and have substantial ion exchange capabilities due to the presence of significant amounts of alkali and/or alkaline earth metal cations, such as sodium, calcium, potassium and/or magnesium. The more preferred naturally occurring zeolites are chabazite and clinoptilolite or mixtures thereof. Clinoptilolite typically contains sodium and/or potassium cations and has a pore size of about 3.5 angstroms, whereas chabazite usually contains calcium and/or sodium cations and has a pore size of about 4.3 angstroms. Naturally occurring zeolites having a pore size between about 2.5 and 4.5 are most preferred for use in the adsorption vessel.

In addition to the synthetic and naturally occurring zeolites discussed above, it is also possible to use modified zeolites in vessel 96. Modified zeolites are zeolites that have been treated with steam to reduce their unit cell size and/or have been impregnated or ion exchanged with other materials in order to increase their efficiency in treating the steam condensate introduced into vessel 96. An example of a preferred modified zeolite is a zeolite that has been ion exchanged with ferric and/or ferrous cations, usually by slurrying the zeolite with an aqueous solution of ferric chloride and/or ferrous chloride, and then drying the resultant wet zeolite (after separation from the liquid phase of the slurry) at a temperature between about 50° C. and 150° C. It has been found that such an iron-exchanged zeolite is quite effective in not only removing ammonia and ammonium ions from the steam condensate, but also in adsorbing heavy metals, such as silver, arsenic, cadmium, cobalt, chromium, copper, mercury, nickel, vanadium and zinc that may be in the condensate. In some instances, an iron-impregnated zeolite made by adding ferric chloride and sodium hydroxide to a slurry of a zeolite in water, separating the zeolite from the liquid phase of the slurry, and then calcining the separated zeolite to form a ferric oxyhydroxide coating can also be used to remove heavy metals along with ammonia and ammonium ions from the steam condensate.

Normally, the contacting of the steam condensate with the zeolite or other molecular sieve in vessel 96 is carried out at a temperature between about 60° F. and 200° F. and at a pressure between about 15 psig and about 50 psig. The temperature of the contacting will typically range between about 90° F. and 150° F., usually between about 110° F. and 130° F. The residence time of the condensate in the adsorption vessel is sufficient to achieve the desired removal of ammonia and ammonium ions. Although FIG. 1 shows the flow of condensate through vessel 96 to be in a downward direction, it will be understood that an upflow or a radial flow configuration may be used if desired.

A steam condensate depleted in ammonia and ammonium ions is withdrawn from adsorption vessel 96 through line 98 and passed through valve 100 into line 102 from where it is passed as make-up water through line 60 to cooling tower 52. The concentration of ammonia and ammonium ions in the condensate withdrawn from the adsorption vessel through line 98 is significantly less than that in the condensate fed to the vessel through line 94 and valve 92. In general, the zeolite or other molecular sieve is initially effective in removing between 50 and 100 weight percent of the ammonia and ammonium ions, calculated as ammonia, from the feed to the adsorption vessel. Usually, flow to the adsorption vessel and the amount and type of zeolite or other molecular sieve used in the vessel is chosen so that between about 70 weight percent and about 100 weight percent of the ammonia and ammonium ions, calculated as ammonia, is removed in vessel 96.

In typical operations of the power generating system shown in FIG. 1 of the drawing, it is not necessary to pass all of the steam condensate exiting the outlet portion 72 of main condenser 42 to cooling tower 52 as make-up water. Typically between about 1 and about 25 volume percent of the condensate is passed through line 86 and valve 88 for use in purging pump seals or for temporary storage in a sump. The remainder of the condensate, usually between about 75 and about 99 volume percent, is passed through line 84, valve 90, line 94 and valve 92 and into adsorption vessel 96.

As pointed out previously, it is necessary to remove ammonia and ammonium ions from the portion of the condensate that is to be passed to the cooling tower. By removing the ammonia and ammonium ions, the primary nutrient for the nitrifying bacteria in the cooling tower is removed and emissions of nitrogen dioxide are significantly decreased and/or substantially prevented. Moreover, removal of the ammonia and ammonium ions also controls the pH in the cooling tower in a range between about 6 and about 8.5 without the necessity of adding caustic soda, soda ash and/or lime. It is, however, usually necessary to add a corrosion inhibitor to the cooling tower if the associated piping and other equipment is made from carbon steel rather than from an alloy or fiberglass. In such a case, the corrosion inhibitor is introduced into the cooling tower catch basin 85 through line 104. Also, it is generally necessary to use a biocide, such as chlorine, ozone, a quaternary amine or a carbamate, to control nitrifying and other bacteria in the cooling tower. Typically, this biocide is added to the cooling tower catch basin via line 106. In some cases, a second biocide may be needed to convert hydrogen sulfide into sulfate salts in accordance with the processes set forth in U.S. Pat. Nos. 5,028,340 and 5,061,373, the disclosures of which are herein incorporated by reference in their entireties.

Although the effluent removed from adsorption vessel 96 does not typically contain a significant amount of ammonia or ammonium ions, it will normally contain relatively large amounts of potassium, calcium and/or sodium salts whose presence is due to the displacement by ammonium ions of potassium, calcium and/or sodium cations from the ion exchange sites in the naturally occurring zeolites that are normally preferred for use in the adsorption vessel. Over time, the concentration of such salts in the cooling tower catch basin 85 can increase to a level which may cause excessive corrosion in the cooling tower. In order to prevent such corrosion, it is typically desired to avoid the build up of such salts by removing, either periodically or continuously, a small portion or slipstream of the condensate (commonly referred to as blowdown) from the catch basin through line 108 and valve 110 to a sump, not shown in the figure, for subsequent disposal.

At some point in time, the molecular sieve in adsorption vessel 96 will become spent, i.e., it will no longer be effective for removing significant amounts of ammonia and ammonium ions from the condensate fed into the extraction vessel through line 94. When this occurs, the condensate can be diverted to a second adsorption vessel 112 containing a fresh bed of the zeolite or other molecular sieve. This is accomplished by closing valve 92 and passing the condensate through line 84, valve 114 and line 116 into adsorption vessel 112. Here, the condensate is passed downwardly through a fresh bed of zeolite or other molecular sieve so that ammonia and ammonium ions (from the ammonia precursors in the condensate) an be removed without interruption during operations of the power plant. A condensate depleted in ammonia and ammonium ions is then removed from vessel 112 through line 118 and valve 120 and passed through lines 102 and 60 to the cooling tower 52.

Once the flow of condensate is bypassed around adsorption vessel 96, via lines 84 and 116 and valve 114, to adsorption vessel 112, valve 100 in the outlet line 98 of adsorption vessel 96 can be closed to isolate the vessel from the system and allow regeneration of the spent zeolite or other molecular sieve. This regeneration may be accomplished by feeding brine into adsorption vessel 96 through line 122. As the brine passes upward through the bed it displaces ammonia from adsorption sites in the pores or cavities of the sieve and exchanges with ammonium cations at ion exchange sites in the sieve. The ammonia and ammonium-laden brine is withdrawn from the vessel through line 124 and sent to a sump for subsequent disposal in an injection well.

Typically, the brine used for regeneration is produced in the brine handling portion of the power plant, thereby making the regeneration of the zeolite or other molecular sieve used in the adsorption vessel economical and efficient. Normally, the brine used as the regenerant is first treated to prevent silica from precipitating in the bed of zeolite or other molecular sieve in the adsorption vessel. Brine so treated can be obtained from the clarification step in the brine handling portion of the geothermal power plant or from the top of a sump where brine has had a chance to cool so that the silica can precipitate out. Alternatively, the brine used as the regenerant can be treated with an acid to lower the pH to between about 4 and 5 and thereby prevent silica from precipitating. Such a method of preventing silica precipitation is taught in U.S. Pat. No. 4,500,434, the disclosure of which is herein incorporated by reference in its entirety.

The nature and objects of the invention are further illustrated by the following examples, which are provided for illustrative purposes only and not to limit the invention as defined by the claims. The examples illustrate that naturally occurring zeolites and their mixtures can effectively remove ammonia and ammonium ions from steam condensate produced in a geothermal power plant.

EXAMPLE 1

Fifty milliliters of an intimate mixture of two zeolites, which mixture was purchased as Biomin EC-M from Biomin International of Huntington Woods, Mich., was placed in a glass column 12 inches in height and 1 inch in inside diameter. The mixture was supported by a cotton plug near the bottom of the column. Biomin EC-M natural zeolite is a mixture of 12 to 20 mesh (Tyler Standard Sieve Series Scale) chabazite and clinoptilolite in the sodium exchange form. A steam condensate obtained from the main condenser of a geothermal power plant, which condensate contained about 203 milligrams per liter of ammonia and/or ammonium ions, calculated as ammonia, was passed through the column at a rate of about 21 milliliters per minute or 25 bed volumes per hour. Effluent samples of about 25 milliliters each were taken periodically and analyzed both for ammonia and ammonium ions utilizing the "ammonia by distillation" technique and for certain metals. The results of these tests are set forth in FIG. 2 and in Table 2 below.

TABLE 2

| Sample | Concentration of Component (milligrams/liter) | | | | | | |
|---|---|---|---|---|---|---|---|
| | $NH_3$ | B | Ca | K | Na | Mg | Si |
| Column Feed | 203 | 2.5 | 0.1 | <0.1 | 0.1 | <0.1 | <0.1 |
| Effluent After | | | | | | | |
| 16 Bed Volumes | <1 | 1.9 | 2 | 2.3 | 299 | 0.6 | 6 |
| 24 Bed Volumes | 5 | 2.5 | 1.9 | 2.1 | 293 | 0.5 | 5 |
| 42.5 Bed Volumes | 14 | 1.9 | 1.7 | 2.3 | 280 | 0.7 | 4.2 |
| 65 Bed Volumes | 43 | 1.9 | 2 | 3 | 231 | 2.8 | 2.3 |
| 87.5 Bed Volumes | 127 | 1.9 | 6.6 | 6.2 | 82 | 8.5 | 1.9 |
| 100 Bed Volumes | 160 | N/A | N/A | N/A | N/A | N/A | N/A |

N/A [=] Not analyzed

Figure 2:
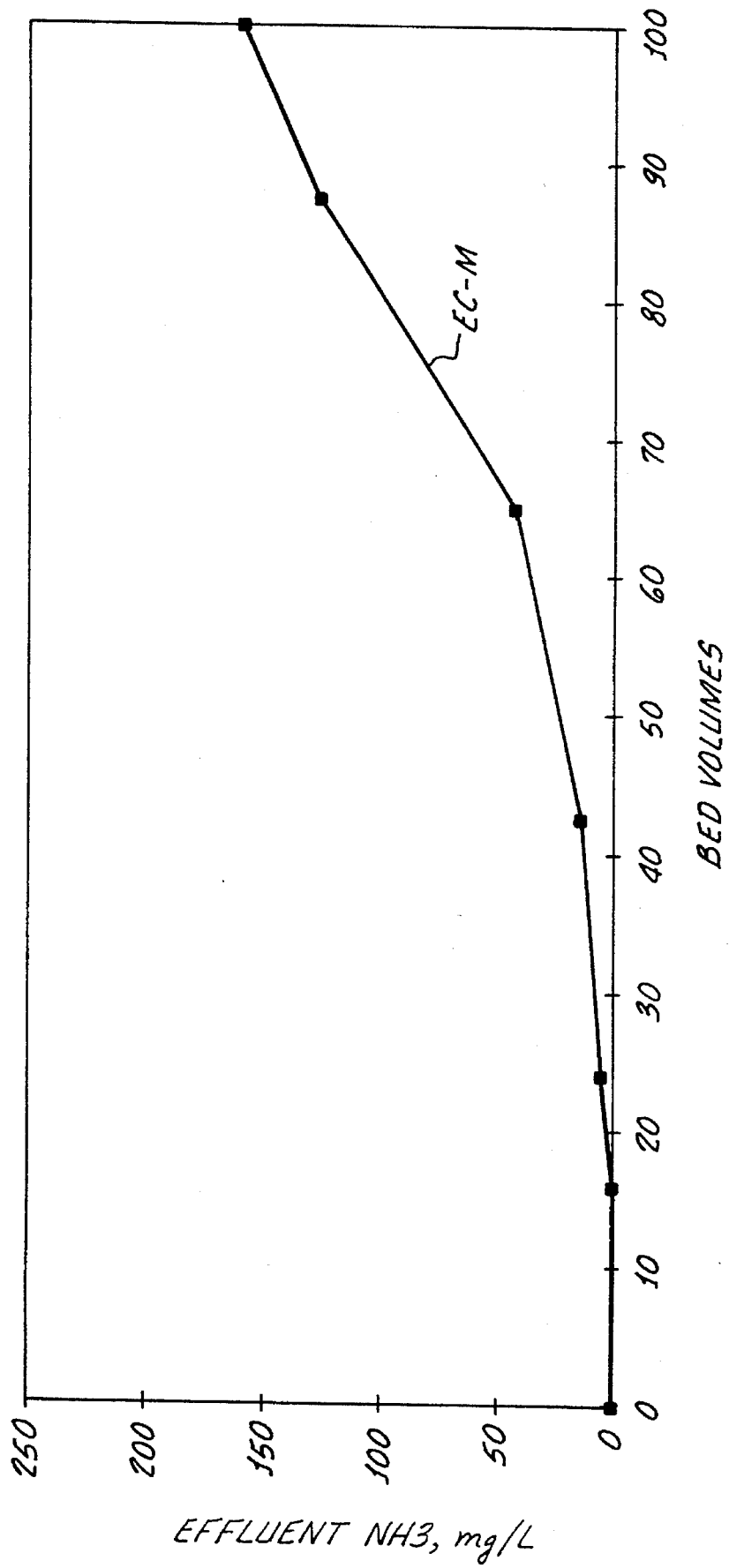
FIG. 2 is a plot which shows the concentration of ammonia and/or ammonium ions, calculated as ammonia, in the effluent from a column containing a mixture of chabazite and clinoptilolite after various amounts of a geothermal steam condensate have been passed through the column.

As can be seen from Table 2 above and FIG. 2, ammonia and ammonium ion breakthrough from the column occurred after about 20 bed volumes of condensate had passed through the column. The figure indicates that the zeolite bed slowly became saturated with ammonia and ammonium ions. Extrapolation of the curve in the figure predicts that complete saturation would occur after about 115 bed volumes of condensate had passed through the column. The data in Table 2 show that the ammonium ions exchanged primarily with sodium ions in the zeolite bed. Minor amounts of boron, calcium, potassium, magnesium and silicon also were found in the effluent. The ammonia and ammonium ion removal efficiency, which was calculated by integrating under the curve in FIG. 2 and subtracting the resulting amount from 100, was found to be about 77 percent over a flow of 100 bed volumes of condensate through the column.

EXAMPLE 2

The ammonia and ammonium ion saturated zeolite bed of Example 1 was regenerated using a synthetic brine solution produced in the laboratory by dissolving 152 grams of sodium chloride, 55 grams of calcium chloride and 38 grams of potassium chloride in 1000 milliliters of water. The resulting synthetic brine contained about 60,000 ppmw sodium and about 20,000 ppmw each of potassium and calcium, calculated as the element. After the steam condensate flow to the glass column had been terminated, the synthetic brine was passed downwardly through the column at a flow rate of about 1 bed volume per hour. The entire effluent from the column was then collected in 2 hour increments (2 bed volumes or 100 ml of condensate) and the resulting 100 milliliter samples were analyzed for ammonia and ammonium ion using the "ammonia by distillation" technique. The results of these tests are set forth below in Table 3.

TABLE 3

| Effluent Sample After | $NH_3$ Concentration (milligrams/liter) |
|---|---|
| 2 Bed Volumes | 3934 |
| 4 Bed Volumes | 1056 |
| 6 Bed Volumes | 54 |
| 8 Bed Volumes | 308 |

As the synthetic brine passes through the column of zeolite, the sodium, potassium and calcium ions in the brine exchange with ammonium ions held at the ion exchange sites in the zeolite and displace ammonia from adsorption sites in the pores or cavities of the zeolite. The decrease in ammonia and ammonium ion concentration shown by the data in Table 3 indicates that regeneration of the zeolite approached completion after 8 bed volumes of the synthetic brine had passed through the column. Extrapolation of the data shows that complete regeneration would be achieved after about 9 bed volumes of brine had passed through the column. When the data in Table 3 is plotted and the area under the curve integrated, the efficiency of regeneration after 8 bed volumes of synthetic brine had passed through the column was calculated to be about 85 percent.

The data discussed above and shown in Tables 2 and 3 demonstrate that ammonia and ammonium ions (from ammonia precursors) can be successfully removed from steam condensate produced in a geothermal power plant utilizing naturally occurring zeolites and relatively high condensate flow rates. Such removal will ensure that there is little or no emissions of ammonia and/or nitrogen dioxide from the power plant cooling tower or when blowdown from the cooling tower is disposed of in injection wells. It is calculated that two 12 foot diameter by 8 foot high beds of 900 cubic feet of zeolite in series could treat the entire amount of steam condensate sent as make-up water to the cooling tower of a 50 megawatt commercial geothermal power plant and reduce the ammonia and ammonium ion content of the condensate by 90 weight percent, calculated as ammonia. Further calculations based on the data indicate that the loading cycle duration of such a commercial installation to treat the condensate would be about 6 hours while the brine regeneration cycle would be about 4½ hours.

EXAMPLE 3

In order to test the ammonia and ammonium ion removal effectiveness of naturally occurring chabazite and clinoptilolite used individually instead of in mixture as was done in Example 1, the procedure of Example 1 was repeated twice using a condensate feed which contained 90 milligrams per liter of ammonia and/or ammonium ions, calculated as ammonia. In the first repeat the bed in the glass column contained 50 milliliters of TSM-310 natural sodium chabazite, and in the second repeat it contained 50 milliliters of TSM-140 natural sodium clinoptilolite, both zeolites having been purchased from Steelhead Specialty Minerals of Spokane, Wash. The results of these tests are set forth in FIG. 3.

Figure 3:
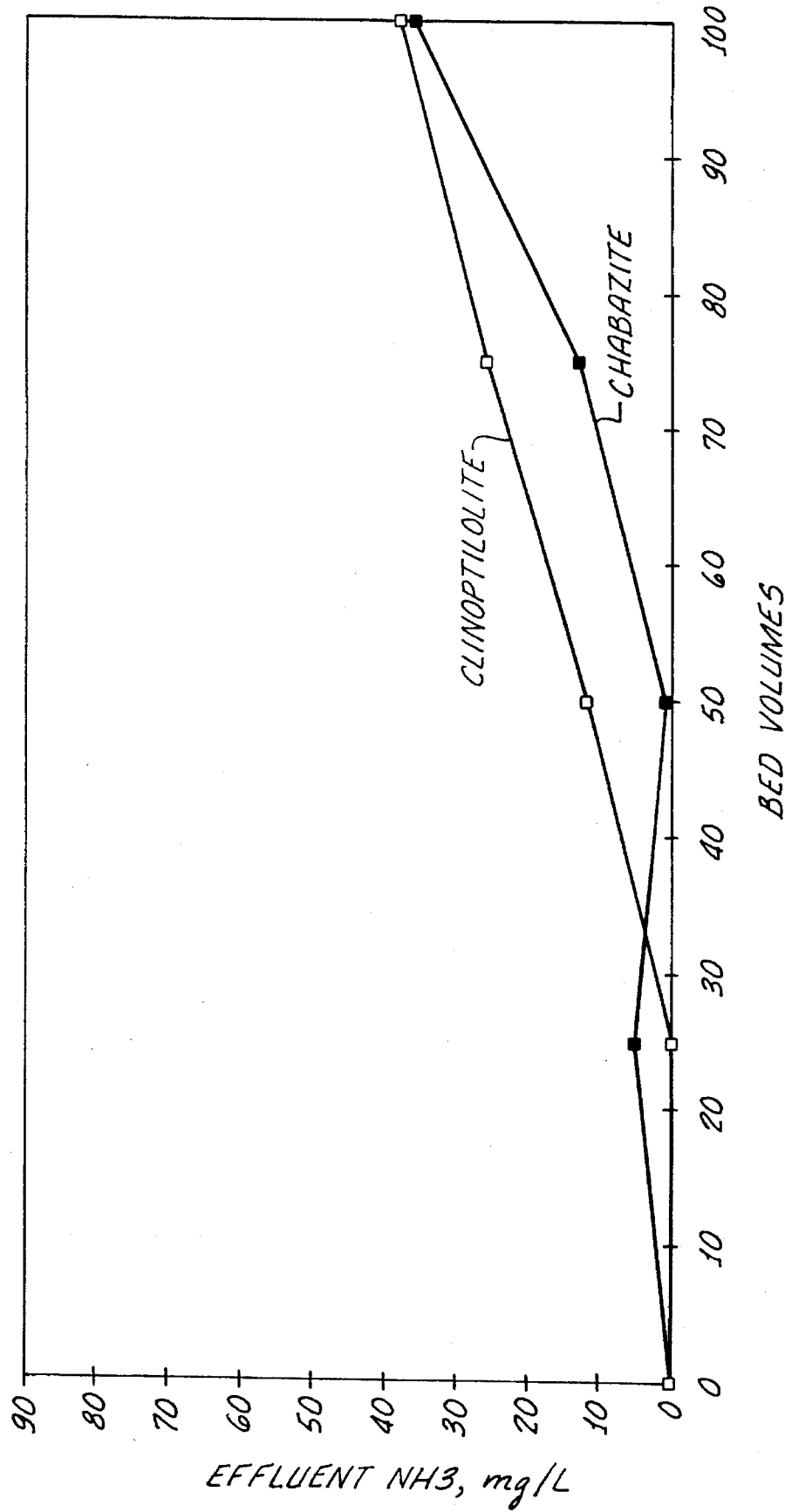
FIG. 3 is a plot which shows the concentration of ammonia and/or ammonia ions calculated as ammonia, in the effluent from a column containing only chabazite and from a column containing only clinoptilolite after various amounts of a geothermal steam condensate have been passed through both columns.

As can be seen from the data in FIG. 3, breakthrough of ammonia and/or ammonium ions from the bed of chabazite occurred after about the 50 bed volume mark, while breakthrough from the bed of clinoptilolite occurred after about 25 bed volumes of condensate had passed through the column. The efficiency of ammonia and ammonium ion removal was calculated for both zeolites by integrating their respective curves and subtracting the resulting number from 100. These calculations showed that the efficiency of removal for chabazite over 100 bed volumes of condensate was about 90 percent, whereas that for clinoptilolite was about 84 percent. These data indicate that the individual zeolites are as effective as their mixture in removing ammonia and ammonium ions from steam condensate.

EXAMPLE 4

The ammonia and ammonium ion removal effectiveness of an iron-exchanged chabazite was measured along with the ability of this modified zeolite to remove arsenic from steam condensate. The iron-exchanged zeolite was prepared by placing 30 milliliters of TSM-310 natural sodium chabazite obtained from Steelhead Minerals of Spokane, Wash., in a beaker and then adding 120 milliliters of a 2.5 molar aqueous solution of $FeCl_3.6H_2O$. The resulting mixture was stirred gently with a rod for 5 minutes. After the zeolite was allowed to settle, the liquid was decanted and the wet zeolite was oven dried at 110° C. for 3 hours. The dried iron-exchanged zeolite contained 0.43 weight percent ferric iron and had a BET surface area of 122 $m^2/g$.

In order to test the ability of the iron-exchanged chabazite to remove ammonia and ammonium ions from a steam condensate containing about 77.4 mg/liter of ammonia and ammonium ions, calculated as ammonia, which condensate was obtained from the main condenser in a geothermal power plant, 1 gram of the iron-exchanged zeolite was slurried with 100 milliliters of the condensate in a glass bottle. The bottle was then placed in a mechanical shaker and was shaken for 5 minutes. The contents of the bottle were then allowed to stand until the iron-exchanged zeolite settled to the bottom of the bottle. About 50 milliliters of the supernatant condensate was removed from the bottle and analyzed for ammonia and ammonium ions utilizing the "ammonia by distillation" technique. The analysis showed that about 18.2 mg/liter of ammonia and ammonium ions, calculated as ammonia, remained in the condensate, thereby indicating that the iron-exchanged zeolite removed about 77 weight percent of the ammonia and ammonium ions.

The ability of the iron-exchanged chabazite to remove heavy metals, such as arsenic, simultaneously with ammonia from steam condensate was measured by repeating the above-described test after 0.01 grams of $As_2O_3$ had been added to 100 milliliters of the ammonia and ammonium ion-containing condensate. The resultant mixture was shaken for 1 hour to produce a condensate containing about 7.6 mg/liter of arsenic. The arsenic and ammonia-containing condensate was then contacted with the iron-exchanged chabazite as described above, and the supernatant liquid was analyzed for ammonia using the "ammonia by distillation" technique and for arsenic using atomic adsorption. The analyses showed that the treated condensate contained 0.1 mg/liter of arsenic and 62 mg/liter of ammonia and ammonium ions, calculated as ammonia. Thus, the iron-exchanged zeolite was effective in removing arsenic and ammonia simultaneously. It is believed that the ability of the zeolite to remove ammonia would increase significantly if the concentration of arsenic in the condensate was lower, e.g., below about 1.0 mg/liter, as is typical in commercial geothermal power plants.

Although this invention has been described in conjunction with an example and by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for controlling the emissions of ammonia and nitrogen dioxide in a system in which the flow of ammonia-containing steam is used to generate electric power, said system including (i) at least one steam turbine, (ii) at least one steam condenser downstream of said turbine in which at least some of the ammonia-containing steam is condensed to steam condensate containing dissolved ammonia and ammonium ions and (iii) at least one cooling tower for cooling the condensate, the cooling tower being open to the atmosphere and having associated therewith a condensate catch basin from which cooled condensate is passed to said condenser to condense said ammonia-containing steam, said process comprising the step of contacting said condensate prior to its introduction into said cooling tower with a crystalline aluminosilicate zeolite under conditions such that sufficient ammonia and ammonium ions are removed from said condensate so that the emissions of nitrogen dioxide and ammonia from said cooling tower are reduced, wherein the source of said ammonia-containing steam is a geothermal fluid.

2. A process as defined by claim 1 wherein the source of said ammonia-containing steam is a geothermal brine.

3. A process as defined by claim 1 wherein said zeolite is selected from the group consisting of chabazite, clinoptilolite and mixtures thereof.

4. A process as defined by claim 1 wherein said steam condensate contains between about 100 and about 400 mg/liter of ammonia and ammonium ions, calculated as ammonia, between about 10 and about 200 mg/liter of hydrogen sulfide and sulfide ions, calculated as sulfide ion ($S^=$), and between about 150 and about 600 mg/liter of carbon dioxide and carbonate ion, calculated as carbonate ion ($CO_3^=$).

5. A process as defined by claim 1 wherein a nonoxidizing biocide other than a carbamate is added to said cooling tower catch basin in order to control the growth of one or more organisms selected from the group consisting of algae, fungi and bacteria.

6. A process as defined by claim 1 carried out in the absence of an oxidative biocide.

7. A process as defined by claim 1 further comprising the step of contacting said zeolite with a geothermal brine in order to regenerate said zeolite by removing ammonia and ammonium ions from said zeolite, wherein the source of said geothermal brine is said geothermal fluid.

8. A process as defined by claim 7 wherein said geothermal brine is stabilized against silica precipitation.

9. A process for controlling the emissions of ammonia and nitrogen dioxide from a system for handling the flow of steam condensate condensed from a geothermal fluid and containing ammonia and ammonium ions, which process comprises contacting said condensate with a molecular sieve to remove at least a portion of said ammonia and said ammonium ions so that the emissions of ammonia and nitrogen dioxide from said system are reduced.

10. A process as defined by claim 9 carried out in the absence of an oxidative biocide.

11. A process as defined by claim 1 wherein said molecular sieve comprises a crystalline aluminosilicate zeolite.

12. A process as defined by claim 11 wherein said zeolite is a naturally occurring zeolite.

13. A process as defined by claim 12 wherein said naturally occurring zeolite is selected from the group consisting of faujasite, chabazite, phillipsite, gmelinite, mordenite, clinoptilolite, erionite, natrolite, heulandite and mixtures thereof.

14. A process as defined by claim 11 wherein said zeolite is a synthetic zeolite.

15. A process as defined by claim 11 wherein said steam condensate is condensed from geothermal steam.

16. A process as defined by claim 11 wherein said zeolite is contacted with said steam condensate at a temperature between about 60° F. and about 200° F. and at a pressure between about 15 psig and about 50 psig.

17. A process as defined by claim 11 wherein said process further comprises the step of contacting said zeolite with a geothermal brine in order to regenerate said zeolite by removing ammonia and ammonia ions from said zeolite.

18. A process as defined by claim 11 wherein said handling system comprises a cooling tower into which at least a portion of said steam condensate is passed, and from which nitrogen dioxide emissions are substantially reduced by contacting said condensate with said zeolite prior to passing said condensate into said cooling tower.

19. A process as defined by claim 18 wherein said steam condensate has a pH between about 4.0 and about 10.

20. A process as defined by claim 18 wherein said steam condensate contains dissolved hydrogen sulfide and dissolved carbon dioxide and has a pH between about 5.0 and about 9.

21. A process as defined by claim 11 wherein said zeolite has been exchanged with cations selected from the group consisting of ferric and ferrous cations.

22. A process as defined by claim 21 wherein said zeolite comprises a ferric-exchanged chabazite.

23. A process for reducing ammonia and nitrogen dioxide emissions from a cooling tower into which an aqueous stream containing ammonia and ammonium ions is passed, wherein said aqueous steam is condensed from a geothermal fluid, which process comprises contacting said aqueous stream with a molecular sieve to remove at least a portion of said ammonia and said ammonium ions prior to passing said stream into said cooling tower.

24. A process as defined by claim 23 wherein between about 50 and about 100 weight percent of the ammonia and ammonium ions, calculated as ammonia, in said aqueous stream is removed.

25. A process as defined by claim 23 wherein said molecular sieve comprises a zeolite.

26. A process as defined by claim 25 wherein said zeolite has been exchanged with cations selected from the group consisting of ferric cations and ferrous cations.

* * * * *

UNITED STATES PATENT AND TRADEMARK OFFICE
CERTIFICATE OF CORRECTION

PATENT NO.   :   5,622,632
DATED        :   April 22, 1997
INVENTOR(S)  :   Darrell L. Gallup It is certified that error appears in the above-indentified patent and that said Letters Patent is hereby corrected as shown below:

Column 15, claim 11, line 20, after "claim" delete 1 and insert in place thereof -- 9 --.

Signed and Sealed this

Fourteenth Day of July, 1998

Attest:

BRUCE LEHMAN

Attesting Officer

Commissioner of Patents and Trademarks